(12) United States Patent
Flores et al.

(10) Patent No.: US 9,171,157 B2
(45) Date of Patent: Oct. 27, 2015

(54) METHOD AND SYSTEM FOR TRACKING ACCESS TO APPLICATION DATA AND PREVENTING DATA EXPLOITATION BY MALICIOUS PROGRAMS

(75) Inventors: Jose Flores, Autin, TX (US); Wei Lu, Austin, TX (US); Ronnie Blewer, Houston, TX (US); Yariv Kaplan, Austin, TX (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 2086 days.

(21) Appl. No.: 11/391,017

(22) Filed: Mar. 28, 2006

(65) Prior Publication Data

US 2007/0240215 A1    Oct. 11, 2007

(51) Int. Cl.
*G06F 21/00* (2013.01)
*G06F 21/56* (2013.01)
*G06F 21/55* (2013.01)

(52) U.S. Cl.
CPC .............. *G06F 21/566* (2013.01); *G06F 21/55* (2013.01); *G06F 21/56* (2013.01)

(58) Field of Classification Search
USPC ...................................................... 726/22–25
See application file for complete search history.

(56) References Cited

U.S. PATENT DOCUMENTS

| | | | |
|---|---|---|---|
| 7,093,239 B1* | 8/2006 | van der Made | 717/135 |
| 7,096,368 B2* | 8/2006 | Kouznetsov et al. | 713/189 |
| 7,181,768 B1* | 2/2007 | Ghosh et al. | 726/23 |
| 7,343,624 B1* | 3/2008 | Rihn et al. | 726/24 |
| 7,366,785 B2* | 4/2008 | Ishiyama et al. | 709/229 |
| 2004/0054917 A1 | 3/2004 | Obrecht et al. | |
| 2004/0064736 A1 | 4/2004 | Obrecht et al. | |
| 2004/0098607 A1* | 5/2004 | Alagna et al. | 713/200 |
| 2004/0123157 A1 | 6/2004 | Alagna et al. | |
| 2004/0187023 A1 | 9/2004 | Alagna et al. | |

* cited by examiner

*Primary Examiner* — Jeffrey Pwu
*Assistant Examiner* — Helai Salehi
(74) *Attorney, Agent, or Firm* — Ascenda Law Group, PC

(57) ABSTRACT

Provided are a method and system for tracking access to application data and preventing data exploitation by malicious programs. In one example, the method includes shimming into a running process of the system to create at least one monitoring hook to monitor a program, building an execution path of the monitored program, and monitoring a behavior of the execution path for malicious behavior using the monitoring hook.

18 Claims, 4 Drawing Sheets

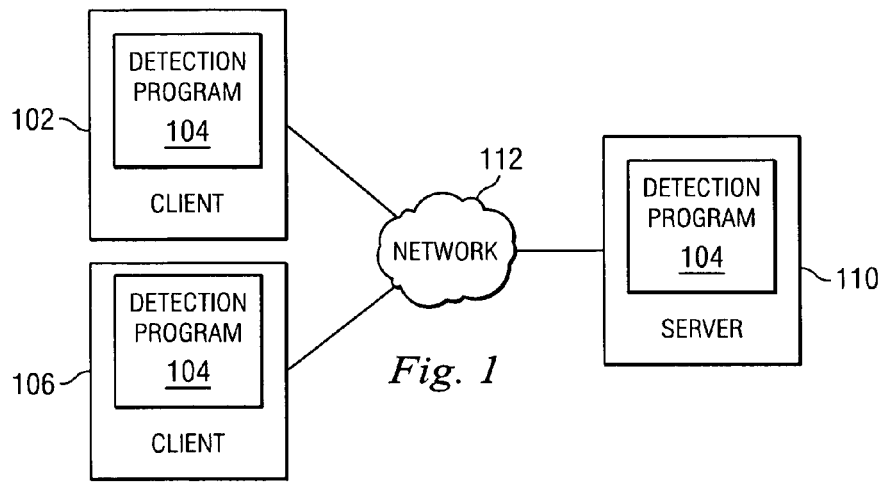
*Fig. 1*
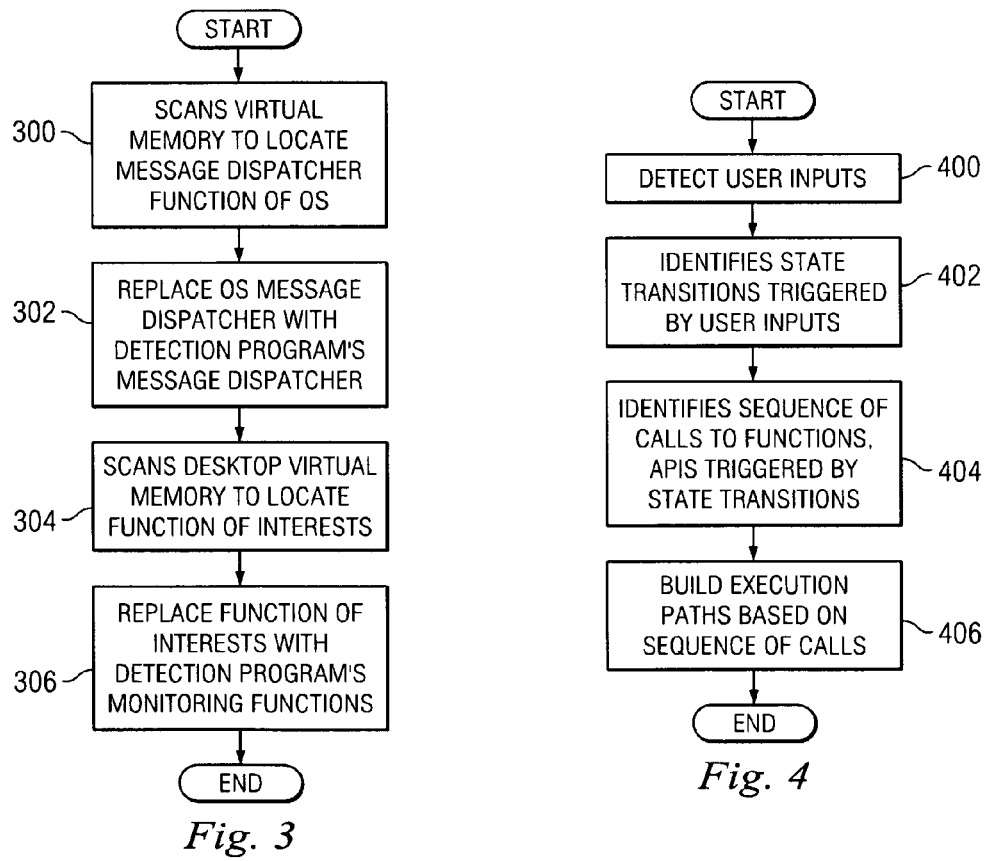

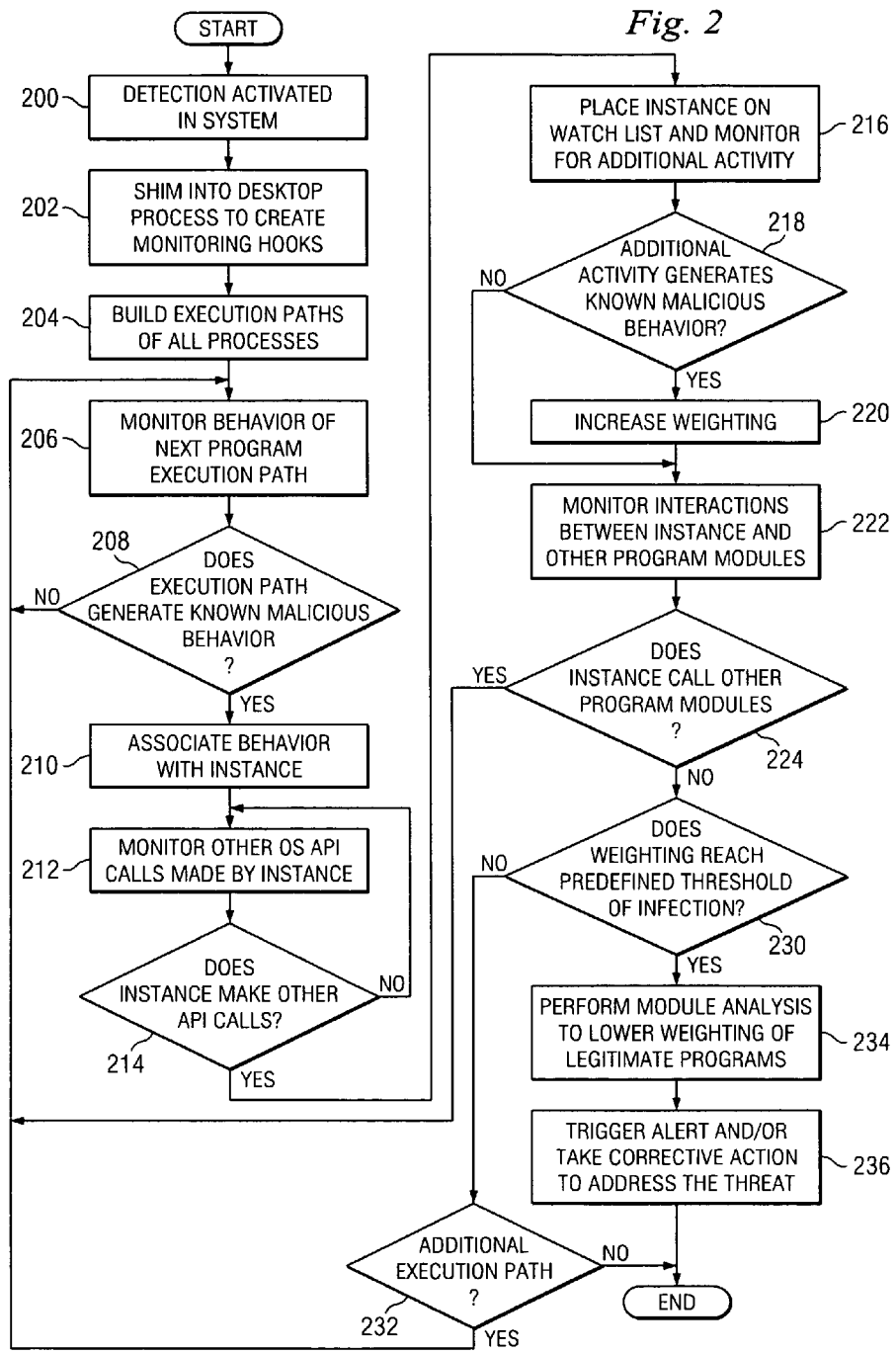

```

700
1. BOOL DetectMalwareModule()                          ↙
2. {
3.      InitializeDetection();   706      702
4.                               ⌒⌒⌒     ↙
5.      BOOL bKLDriverResult = DetectKLDriver();
6.
7.      BOOL bKLPollingResult = DetectKLState();
8.                            ⌒⌒⌒        ⌒⌒⌒
9.      InitializeKLHook();    708         704
10.                                 710
11.     If ( InstallHookCallBack() == SUCCESS )
12.     {                      ⌒⌒⌒
13.            LaunchKLHoneyPot();  712
14.     }       716                714
15.              \                 /
16.     BOOL bKLHookResult = DetectKLHook();
17.
18.     Return bKLDriverResult | bKLPollingResult | bKLHookResult;
19. }       /                  \                  \
           706                708                716
```

METHOD AND SYSTEM FOR TRACKING ACCESS TO APPLICATION DATA AND PREVENTING DATA EXPLOITATION BY MALICIOUS PROGRAMS

BACKGROUND

Malicious software ("malware") refers to software programs that perform unwanted functions on a system. Examples of malware include computer viruses, worms, Trojans, spyware, keyloggers, and the like. Currently, the detection of malware is primarily performed using two known methods. One method is a signature-based approach, which detects binary digital bit streams or patterns in the binary object code of malware based on a list of binary strings that are found in known malware programs. Another method is a rule-based or heuristic approach, which detects malware programs based on behaviors that are shared by malware programs of a given class. These methods, however, have their downsides. If the behavior patterns are too narrowly defined, some malware programs may not be detected, which results in compromising the system. If the rules are too broadly defined, non-harmful programs may be mistaken for malware programs, which results in false alarms and potentially corrective action that is mistakenly applied.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 1 is a diagram of a network of data processing systems in which a detection program may be implemented.

FIG. 2 is a process flowchart of an embodiment of the detection program of FIG. 1.

FIG. 3 is a process flowchart of an embodiment of a portion of the detection program of FIG. 2 for shimming into a device desktop process and creating real-time monitoring hooks.

FIG. 4 is a process flowchart of an embodiment of a portion of the detection program of FIG. 2 for building execution paths of a program.

DETAILED DESCRIPTION

Figure 5:
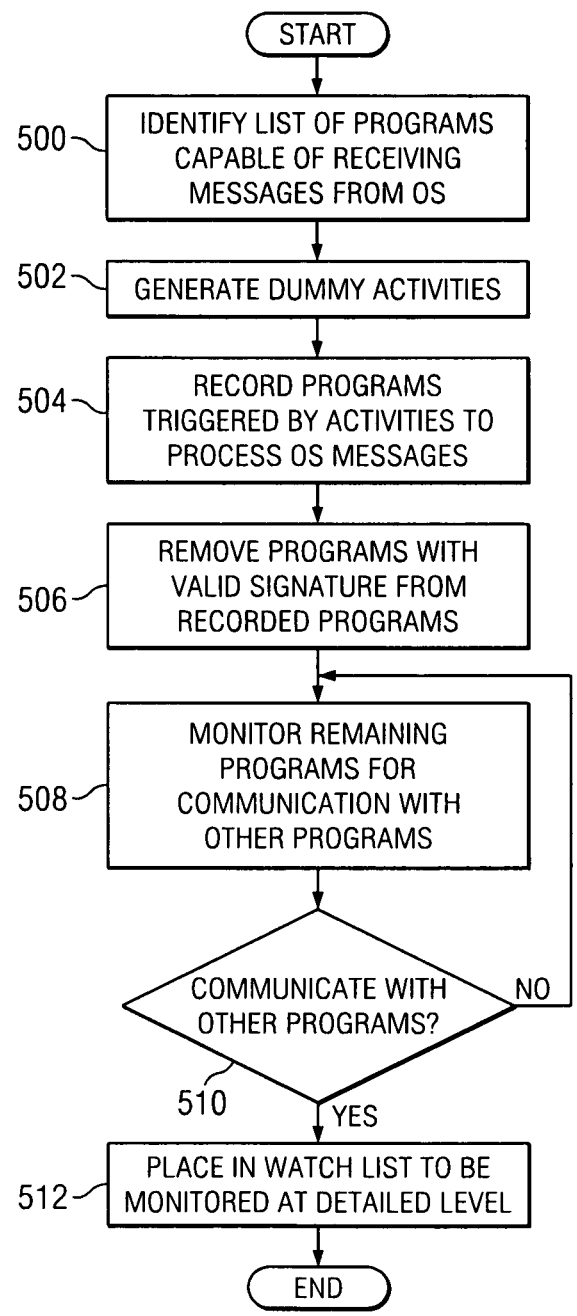
FIG. 5 is a process flowchart of an embodiment of a portion of the detection program of FIG. 2 for monitoring the behavior of an execution path.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Aspects of the present disclosure provide a computer implemented method, a computer system, and a computer program product for tracking access to application data and preventing data exploration by malicious programs. The aspects of the present disclosure provide a detection program that detects malware programs by performing a real-time weighted analysis of a program's complete execution path. In an illustrative embodiment, the detection program monitors normal execution of programs in real time to generate probability ratings or weightings. A weighting is generated based on interactions between the running program and its internal functional modules, as well as externally called functional modules and/or application programming interfaces (APIs). If the weighting reaches a pre-defined threshold of infection, the detection program identifies the running program as a malware program and automatically triggers an alert and/or takes corrective action to address the threat.

FIG. 1 is a diagram of one embodiment of a network of data processing systems in which a detection program may be implemented. In this illustrative example, clients 102 and 106 are examples of a computer in which computer usable code or instructions for implementing embodiments of the present disclosure may be located. Clients 102 and 106 may be coupled to a network, such as a network 112. Network 112 may be any type of wireless or wireline network, such as a local area network (LAN), a wireless local area network (WLAN), or the Internet. A server 110 is also coupled to network 112 and may communicate with clients 102 and 106 via network 112 using a communications protocol, such as a Transmission Control Protocol/Internet Protocol (TCP/IP). It is understood the clients may be stationary devices (e.g., desktops) or mobile devices (e.g., laptops, personal digital assistants, or cellular phones).

An operating system running on clients 102 and 106 coordinates and provides control of various components. As a client, the operating system may be a commercially available operating system such as Microsoft® Windows® XP (Microsoft and Windows are trademarks of Microsoft Corporation, Seattle, Wash.). An object-oriented software system, such as the Java™ software system, may run in conjunction with the operating system and provide calls to the operating system from Java™ programs or applications executing on clients 102 and 106. (Java is a product available from Sun Microsystems, Inc, of Santa Clara, Calif.) It is understood that the present disclosure may be used with other operating systems and applications written using other programming languages.

A detection program 104 may be implemented directly on a client, such as clients 102 and 106, may be implemented on the server 110, or may be distributed between, for example, client 102 and server 110. In an alternative embodiment, clients 102 and 106 may access detection program 104 from a monitoring device, such as server 110. The detection program 104 may be developed using an object-oriented programming language, such as Java™ or C++. It is understood that FIG. 1 is intended as an example, and not as an architectural limitation for different embodiments of the present disclosure.

The detection program 104 of the present disclosure detects malware programs, such as a keylogger. A keylogger is a program designed to surreptitiously capture the typed input of a user. The captured input is usually either saved in a log file locally or transmitted to a third party or a computer system remotely over a network. Keyloggers are often used to steal user identities and logon credential information, as well as other important data. In addition to keyloggers, other types of malicious programs, such as a virus or a spyware program, may also be detected by detection program 104. Detection program 104 may be activated by a user of the system, automatically upon a user login to the system or network, or upon the occurrence of other events.

The detection program 104 monitors the behavior of a potential malware program (i.e., a "program of interest") based on the interaction between the program of interest and the operating system as well as the interaction between the program of interest and other external programs and program modules. In addition to the interaction between the program of interest and the operating system, the detection program 104 may monitor operating system resources, for example, the key message queue in the case of keyloggers. Based on such monitoring, the detection program 104 associates a weighting with each program of interest. The weighting indicates the probability that the program of interest is a malware program. The higher the weighting of the program, the more likely it is the program is malicious. If a running program of interest attempts to activate functional modules that are outside of the program and such activation causes malicious behavior, the weighting of the program is increased. In the example of keyloggers, an attempt to access the key message queue may increase the weighting of the program. Although a higher weighting is indicative of a higher probability of maliciousness in the present example, it is understood that a weighting system may be implemented that uses a lower weighting to indicate a higher probability of maliciousness.

If a relationship is found where the program of interest is designed to initiate other function calls or programs that may indicate the presence of malware, but has not yet called those functions, the weighting of the program may also increase. For example, the detection program 104 may detect that KL.exe calls other programs, such as KLHELPER.exe, and that KLHELPER.exe includes behavior that may indicate the presence of malware. The weighting of KLHELPER.exe's behavior is added to KL.exe's weighting, which raises the probability that KL.exe is a malware program. Thus, the detection program 104 monitors the interactions across multiple program modules instead of a single program or program module.

If the weighting of the program of interest reaches a pre-defined threshold of infection, the detection program 104 identifies the program as a malware program and triggers an alert. The alert may perform any number of predefined actions, including informing a user that further analysis is needed or causing the detection program 104 to automatically take corrective action to address the malware threat. When the alert is triggered, the detection program 104 may also perform a module analysis that may result in lowering the probability of the program being a malware program. For example, the module analysis may be based upon the program's association with, and its ability to call, other non-malware programs, such as APIs or programs whose behavior in conjunction with the calling program is associated with normal maintenance of the system, software updates, operating system updates, and the like.

FIG. 2 is a process flowchart of an embodiment of a detection program, such as the detection program 104 of FIG. 1. As shown in FIG. 2, from the perspective of the detection program 104, the process begins when the detection program is activated in the user system (step 200). The detection program 104 may be, for example, activated by the user of the system (e.g., the client 102 or 106 of FIG. 1) or automatically activated upon a user login to the system network. Next, the detection program 104 shims into a device desktop process and creates real-time monitoring hooks (step 202). A more specific example of step 202 is discussed below with reference to FIG. 3.

After step 202, the detection program 104 builds execution paths of all processes and modules for use with the monitoring hooks (step 204). Execution paths are sequences of calls made by a program to functions and APIs of the system, and logical state machines that define the functions and APIs of the system. A more specific example of step 204 is discussed below with reference to FIG. 4. After the execution paths are built, the detection program 104 begins monitoring the behavior of one of the execution paths (step 206). A more specific example of step 206 is discussed below with reference to FIG. 5. A determination is then made by the detection program 104 as to whether the sequence of calls made in the execution path generates any known malicious behavior (step 208). This step may be performed by examining pre-defined behavior rules that identify potentially malicious behavior. An example of a known malicious behavior may be a call to a function that processes key messages. If the sequence of calls generates malicious behavior, the detection program 104 associates the behavior with a potential malware infection instance (step 210). However, if no malicious behavior is generated, the process returns to step 206 to continue monitoring the behavior of the next execution path.

If the behavior is associated with a potential malware infection instance in step 210, the detection program 104 monitors whether the instance makes other operating system API calls (step 212). A determination is then made as to whether the instance makes other OS API calls (step 214). If other OS API calls are made, the detection program 104 places the instance on a watch list and monitors for additional activity generated by the instance (step 216). However, if no other OS API calls are made, the process returns to step 212 to continue monitoring the behavior of the instance.

If the instance is placed on a watch list in step 216, a determination is then made by the detection program 104 as to whether additional activities that are generated by the other OS API calls generate known malicious behavior (step 218). This step may be performed by examining the pre-defined malware behavior rules. If so, the detection program 104 increases the weighting of the instance to indicate that it is a potential malware program (step 220) before continuing to step 222. For example, if a program of interest named KL.exe is identified by the detection program as a potential malware infection instance, KL.exe is then monitored at a more detailed level. If the detailed monitoring performed by the detection program 104 identifies additional activity that is associated with a type of malware, the weighting is increased. However, if no additional activity is identified, the weighting stays the same and is increased only if the behavior profile changes.

In step 222, the detection program 104 monitors the interaction between the instance and other program modules. A determination is then made by the detection program 104 as to whether the instance attempts to call program modules that are outside of the instance (step 224). If the instance calls outside program modules, the detection program 104 returns to step 206 to monitor the behavior of the called program modules. If the instance does not call outside program modules, the process continues to step 230.

In step 230, a determination is made as to whether the weighting of the program instance reaches a pre-defined threshold of infection. If the pre-defined threshold of infection is reached, the detection program 104 may perform a module analysis, which lowers the weighting of the instance if the instance is calling legitimate programs (step 234). A more specific example of step 234 is discussed below with reference to FIG. 6. When the threshold of infection is crossed, an alert is triggered by the detection program 104 and/or corrective action is taken by the detection program 104 to address the threat (step 236). The process may then terminate. Returning to step 230, if the weighting does not reach the pre-defined threshold, a determination is then made by the detection program 104 as to whether an additional execution path is present (step 232).

If an additional execution path is present, the process returns to step 206 to monitor the behavior of the next execution path. If no additional execution path is present, the process may terminate. In cases where the execution path is updated during the building of execution paths of a program, the detection program 104 checks the behavior of the execution path against pre-defined behavior rules to determine if the weighting needs to be updated. Examples of pre-defined behavior rules for a potential keylogger program include rules that a program should never make a call to an operating system message processing function, never make a call to a function that processes key messages, never make a call to a function that stores key messages, and never make a call to a function that forwards stored messages to another machine.

FIG. 3 is a process flowchart of a more detailed embodiment of step 202 of FIG. 2 for shimming into a device desktop process and creating real-time monitoring hooks. In this implementation, from the perspective of the detection program 104, the process begins when the detection program 104 scans a virtual memory space of a computer system (e.g., the client 102) to locate a message dispatcher function of the operating system (step 300). An example of a message dispatcher is a Windows® message dispatcher. The message dispatcher dispatches different types of messages depending on the type of event that has occurred. For example, when the user presses a key, the message dispatcher may dispatch a key message that indicates to the operating system that an event has occurred with respect to the keyboard.

After the message dispatcher is located, the detection program 104 replaces the message dispatcher of the operating system with the detection program's message dispatcher (step 302). Thus, a shim for the operating system's dispatcher is created. After the operating system's dispatcher is replaced, the detection program 104 scans the device desktop virtual memory space to locate functions of interest (step 304). An example of a function of interest is a function that processes key messages or stores key messages. Once the functions of interest are located, the detection program 104 replaces the functions with the detection program's monitoring functions (step 306), and thus creates a shim for monitoring malicious behavior for particular functions.

FIG. 4 is a process flowchart of an embodiment of the detection program 104 for building execution paths of a program. Execution paths are sequences of calls made by a program to functions and APIs of the system, and logical state machines that define the functions and APIs of the system. For example, keystrokes that are entered by the user trigger different logical states, which consequently trigger different sequences of calls to the functions and APIs of the system. An execution path is a particular sequence of calls to the functions and APIs of the system resulting from a specific input. For example, a mouse click input on a "Print" button may result in a sequence of calls that print out a copy of a document currently viewed by the user. This sequence of calls is the execution path of the specific input "Print" button mouse click.

The exemplary process in FIG. 4 describes step 204 of FIG. 2 in further detail. As shown in FIG. 4, from the perspective of the detection program 104, the process begins when input from a user is detected (step 400). Examples of user input include a keystroke or a mouse click. Next, the detection program 104 identifies state transitions of the logical state machine that are triggered by the user input (step 402). Based on the state transitions, the detection program 104 identifies a sequence of calls to functions and application programming interfaces (APIs) triggered by the state transitions of the logical state machine (step 404). Once the sequence of calls is identified, the detection program 104 builds execution paths of the program based on the sequence of calls (step 406). The process terminates thereafter.

FIG. 5 is a process flowchart of an embodiment of the detection program 104 for monitoring behaviors of an execution path. This exemplary process describes step 206 of FIG. 2 in further detail. As shown in FIG. 5, from the perspective of the detection program 104, the process begins when the detection program identifies a list of programs that are capable of receiving messages from the operating system (step 500). This step reduces the list of all programs on the system to only a subset of programs that receive messages from the operating system. Next, the detection program 104 generates dummy activities (step 502), such as keystrokes, and records the programs that are triggered by the dummy activities to process operating system messages (step 504). In this example, programs that are triggered to process operating system key messages are recorded. This step further reduces the subset of programs that receive operating system messages to an even smaller subset of programs that contain potential malware programs.

Next, the detection program 104 checks the signature of each of the recorded programs and removes those that have a valid signature from the list (step 506). The signature may include information such as vendor information, installation information, and signing information of the programs. After the programs with valid signatures are removed, the detection program 104 monitors the remaining programs in the list of programs for communication with other programs (step 508), for example, network operations with remote machines, communication operations with other programs that perform network operations, or file operations on files that are shared by another process. A determination is then made as to whether the remaining programs communicate with other programs based on whether they perform any one of the above operations (step 510). If a remaining program communicates with other programs, the program is placed in a watch list to be monitored at a more detailed level (step 512) and the process terminates thereafter. If the remaining program does not communicate with other programs, the process returns to step 508 to examine other remaining programs.

Figures 6, 7:
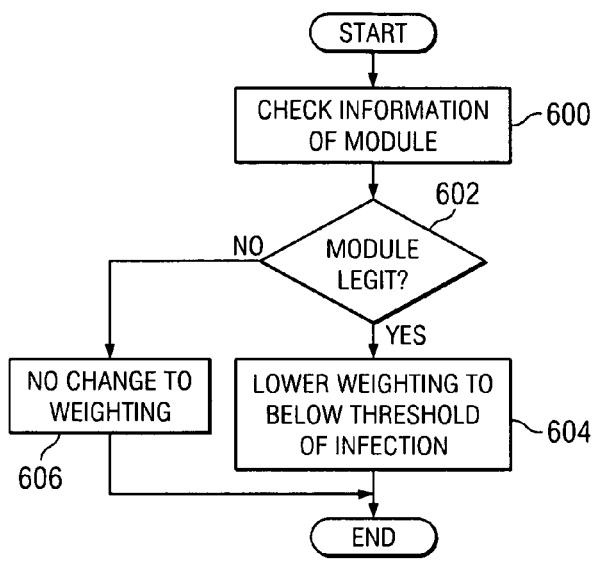
FIG. 6 is a process flowchart of an embodiment of a portion of the detection program of FIG. 2 for performing a module analysis.
FIG. 7 is a diagram of an exemplary implementation of a portion of an embodiment of the detection program of FIG. 1.

FIG. 6 is a process flowchart of an embodiment of the detection program for performing a module analysis. This exemplary process describes step 234 of FIG. 2 in further detail. As described above, the detection program 104 may perform a module analysis to lower the weighting of the program based upon its association and ability to call other legitimate programs. Other legitimate programs include APIs or programs whose behavior in conjunction with the calling program is associated with normal maintenance of the system, software updates, or operating system updates. Thus, the detection program 104 performs a module analysis to reduce the probability of a false alarm.

As shown in FIG. 6, from the perspective of the detection program 104, the process begins when the detection program checks the information associated with a module of the program (step 600). The information of the module that the detection program 104 checks includes information such as the module's loader, the module's vendor, the module's installation procedure if verifiable, and the module's certificate signature if one exists. Examples of a loader include an Internet Explorer helper, a Windows® shell extension, and a preloaded third party module.

A determination is then made as to whether the module is a legitimate program (step 602). This determination is made based on the information of the module examined in step 600. If the information of the module indicates that the module is a legitimate program, the detection program 104 lowers the weighting of the module to below the threshold of infection (step 604). Generally, if a module is a legitimate program, its vendor information is readily available as it is installed through a standard procedure and has a valid certificate signature. However, if the module is not a legitimate program, no change is made to the weighting of the module (step 606). The process terminates thereafter.

As discussed above, in addition to detecting malware programs such as keyloggers, other types of malware programs, including viruses and spyware programs, may be detected using the detection program 104 provided by the present disclosure. In these cases, since there is no known list of signatures, other types of behavior are detected by the detection program 104. For example, the detection program 104 may monitor disk access for viruses that attempt to delete files on the system, monitor network access for viruses that spread and attack other systems within the network, monitor local data storage access for spyware that steals address book information, and monitor frame buffer for spyware programs that capture computer screens.

For the detection of viruses, the pre-defined malware behavior rules are different from the rules defined for the keylogger program. Examples of pre-defined malware behavior rules for viruses include rules for only loading modules that are either common to all programs located in the system-wide directory or specific to a particular program located in the program's installation directory, only accessing files that are either common to all programs located in the system-wide directory or specific to a particular program located in the program's installation directory, never modifying system configuration, modules or files that belong to the operating system, never deleting files belonging to other programs, such as a user's email program, and never making multiple connections to different machines within a short period of time.

For the detection of spyware programs, the pre-defined malware behavior rules are also different from the rules defined for the keylogger program. Examples of pre-defined malware behavior rules for spyware include rules for ensuring that requests to a website generate connections to that website only, that site specific browser objects are only used when the browser is connected to the site, and that site specific browser modules are only used to create, update, or modify a site publisher's resources.

The detection program's monitoring function has the capability to monitor for multiple sets of predefined malware behavior rules simultaneously. Thus, the monitoring function may detect not only potential keylogger programs, but also viruses and spyware programs simultaneously.

FIG. 7 is a diagram of an exemplary implementation of a portion of an embodiment of the detection program 104 of FIG. 1. As shown in FIG. 7, in this example implementation, a DetectMalwareModule 700 is part of detection program 104 that detects suspicious malware programs. DetectMalwareModule 700 first invokes a DetectKLDriver 702 to detect keyloggers that use the keyboard drivers. The detection results are stored in bKLDriverResult 706. Next, DetectMalwareModule 700 invokes DetectKLState 704 to detect keyloggers that use keyboard state polling. The detection results are stored in bkLPollingResult 708.

DetectMalwareModule 700 then attempts to install key message monitoring hooks by invoking InstallHookCallBack function 710. If the hooks are installed successfully, DetectMalwareModule 700 builds a complete execution path by invoking a LaunchKLHoneyPot function 712. In this example, HoneyPot is a module that generates dummy keystrokes and monitors for behaviors that are associated with all running programs including the keyloggers. The monitoring result of the HoneyPot is returned by invoking DetectKLHook function 714 and is stored in bKLHookResult 716.

Finally, DetectMalwareModule 700 merges the detection results, bKLDriverResult 706 and bKLPollingResult 708, with the monitoring result from the HoneyPot, bKLHookResult 716 and returns the merged result to the user. If the merged result is true, the user may retrieve a list of detected malware programs from a data structure, which stores all of the programs that are detected as malware.

In summary, various embodiments of the present disclosure are able to observe potential malicious behavior based on the operation of multiple programs rather than examining a single program or module at a given point of execution. In addition, the present disclosure provides for the monitoring of programs in real time rather than scanning sequentially. In this way, malware threats may be continuously detected and eliminated. Furthermore, various embodiments of the present disclosure may be more efficient than existing methods of detecting malware programs, since multiple programs may be monitored at the same time without sacrificing system performance or overall user experience. Moreover, instead of a one-time or periodic analysis, the weighting of a program may be continuously maintained and adjusted in real time until a pre-defined threshold is reached. In this way, malware threats may be detected and addressed as soon as they are identified.

An embodiment of the present disclosure can take the form of an entirely hardware embodiment, an entirely software embodiment, or an embodiment containing both hardware and software elements. For example, one of the previously described embodiments may be implemented in software, which includes but is not limited to firmware, resident software, microcode, etc. In addition, various steps of the above processes may be performed in another order, split into additional steps, or combined into a single step. Steps may also be removed and or added to any of the above processes.

Furthermore, the present disclosure can take the form of a computer program product accessible from a tangible computer-usable or computer-readable medium providing program code for use by or in connection with a computer or any instruction execution system. For the purposes of this description, a tangible computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital video disc (DVD).

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A method of detecting a malicious program on a computer system, the method comprising:

by a processor of the computer system, activating a detection program, the detection program scanning a virtual memory of the computer system to locate an operating system message dispatcher function, replacing the operating system message dispatcher function with a detection program dispatcher function, scanning a desktop virtual memory space of the computer system to locate a function of interest, and replacing the function of interest with a detection program monitoring hook for the function of interest;

building at least one execution path of at least one process executing on the computer system, said at least one execution path including sequences of calls made by the at least one process to functions and application programming interfaces (APIs) of the operating system;

via the monitoring hook, monitoring behavior of the at least one execution path for atypical behavior in the sequences of calls made in the execution path; and, when atypical behavior is observed in the execution path, associating that behavior with an instance of a program of interest;

when atypical behavior in the execution path is observed, monitoring the instance of the program of interest for additional operating system API calls, and, in the event of such API calls, placing the program of interest on a watch list and further monitoring the program of interest for additional activity that generates atypical behavior and interactions between the program of interest and other program modules running on the computer system;

based on said further monitoring, associating and adjusting a weighting of the instance of the program of interest, the weighting being indicative of a probability that the program of interest is atypical, wherein a decrease in the weighting, as well as an increase in the weighting, both indicate a change in the probability that the program of interest is atypical;

in the event that the weighting reaches a predefined threshold value, performing a module analysis to lower the weighting if the instance of the program of interest is calling a program module that is determined to be a legitimate program, and in the event the weighting crosses the predefined threshold value, triggering an alert.

2. The method of claim 1, wherein determining whether behavior of the at least one execution path includes atypical behavior comprises a determination based on at least one behavior rule.

3. The method of claim 1, wherein monitoring behavior of the at least one execution path comprises: identifying a list of programs in the at least one execution path capable of receiving operating system messages; generating at least one dummy activity; and recording a subset of programs from the list of programs triggered by the at least one dummy activity, wherein the program of interest is in the subset of programs.

4. The method of claim 1, wherein building at least one execution path comprises: responsive to receiving input from a user of the computer system, identifying a plurality of state transitions in a logical state machine triggered by the input; identifying a sequence of calls to functions and application programming interfaces triggered by the plurality of state transitions; and building the at least one execution path based on the sequence of calls.

5. The method of claim 1, wherein monitoring behavior of the at least one execution path comprises: applying at least one predefined rule to the execution path to determine if the execution path generates the atypical behavior; and if the behavior of the execution path generates the atypical behavior, determining if the atypical behavior includes communicating with an operating system interface function.

6. The method of claim 1, wherein monitoring behavior of the at least one execution path comprises: applying at least one predefined rule to the execution path to determine if the behavior of the execution path includes the atypical behavior; if the behavior of the execution path includes the atypical behavior, determining if the atypical behavior includes accessing an operating system resource.

7. The method of claim 2, wherein determining whether the instance of the program of interest makes any operating system API calls comprises monitoring the instance of the program of interest for communications with at least one operating system interface function.

8. The method of claim 2, wherein if the instance of the program of interest accesses an operating system resource, increasing the weighting associated with the program of interest.

9. The method of claim 3, wherein monitoring behavior of the at least one execution path further comprises: determining if a program in the subset of programs has a valid signature; and, if the program in the subset of programs has a valid signature, removing the program from the subset of programs.

10. The method of claim 5, wherein applying the predefined rule includes examining the execution path to ensure that an operating system message processing function is never called, a function that processes key messages is never called, a call to a function that stores the key messages is never made, and a function that forwards stored messages is never called.

11. The method of claim 5, wherein applying the predefined rule includes examining the execution path to ensure that only modules that are either common to all programs or specific to a program located in the program's installation directory are loaded, only files that are either common to all programs or specific to a program located in the program's installation directory are accessed, system configuration files that belong to an operating system are never modified, files belonging to other programs are never deleted, and multiple connections to different machines within a period of time are never made.

12. The method of claim 5, wherein applying the predefined rule includes examining the execution path to ensure that only requests to a specific website are generated, and only site-specific objects of a browser are used when the browser is connected to a website.

13. The method of claim 7, wherein determining whether additional activity generates atypical behavior comprises a decision based on the at least one behavior rule.

14. The method of claim 9, wherein monitoring behavior of the at least one execution path further comprises: monitoring any remaining programs in the subset of programs for communication with other programs; and placing a program of the remaining programs on the watch list if the program communicates with other programs.

15. The method of claim 13, wherein monitoring the program of interest for interactions with other program modules; and if the program of interest interacts with other program modules, comprises monitoring behavior of at least one other program module for atypical behavior based on the at least one behavior rule.

16. The method of claim 13, wherein triggering an alert includes taking a predefined action with respect to the program of interest.

17. The method of claim 16, wherein determining whether a program module that is being called by the instance of the program of interest is a legitimate program comprises examining information associated with the program module of the program of interest; and determining if the program module is legitimate based on the examined information.

18. A malicious program detection system comprising:
   a client; and
   a server coupled to the client via a network, wherein the server includes a processor and a memory for executing and storing a detection program, respectively, the detection program configured to perform the steps of:
      in response to detecting a user login from the client, shimming into an operating system of the client by scanning a virtual memory of the client to locate an operating system message dispatcher function, replacing the operating system message dispatcher function with a detection program dispatcher function, scanning a desktop virtual memory space of the client to locate a function of interest, and replacing the function of interest with a detection program to create monitoring hooks for functions of interest;
      building execution paths of processes running on the client, said execution paths including sequences of calls made by the processes to functions and application programming interfaces (APIs) of the operating system;
      monitoring behavior of the execution paths for atypical behavior using the monitoring hooks; and, when atypical behavior is observed in one of the execution paths associating that behavior with an instance of a program of interest;
      monitoring the instance of the program of interest for operating system API calls, and, in the event of such API calls, placing the program of interest on a watch list and further monitoring the program of interest for additional activity that generates atypical behavior and interactions between the program of interest and other program modules running on the client;
      based on said further monitoring, associating and adjusting a weighting of the instance of the program of interest, the weighting being indicative of a probability that the program of interest is atypical, wherein a decrease in the weighting, as well as an increase in the weighting, both indicate a change in the probability that the program of interest is atypical;
      in the event that the weighting reaches a predefined threshold value, performing a module analysis to lower the weighting if the instance of the program of interest is calling a program module that is determined to be a legitimate program, and
      in the event that the weighting crosses the predefined threshold value, triggering an alert.

* * * * *